United States Patent Office 3,076,006
Patented Jan. 29, 1963

3,076,006
PREPARATION OF ALKYL ALUMINUM COMPOUNDS
Mark R. Kinter and Charles R. Pfeifer, Midland, Mich., assignors to The Dow Chemical Company, Midland, Mich., a corporation of Delaware
No Drawing. Filed June 15, 1955, Ser. No. 515,773
5 Claims. (Cl. 260—448)

This invention relates to the preparation of alkyl aluminum compounds. It particularly concerns the preparation of trialkyl aluminum compounds by the reductive alkylation of aluminum with alpha-olefins. The term "reductive alkylation" is used herein to mean a chemical interaction of aluminum, an alpha-olefin, and hydrogen to form an alkyl aluminum compound such as a trialkyl aluminum. The invention especially pertains to the preparation of triisobutyl aluminum from aluminum, isobutylene, and hydrogen in accordance with the equation:

Recent developments in the making of polymers such as polyethylene have involved polymerizing olefins such as ethylene at relatively low pressures and temperatures in contact with organo-metal compounds as catalysts. Some of these catalysts comprise alkyl aluminum compounds such as triisobutyl aluminum. Triisobutyl aluminum can be prepared by interaction of active aluminum, isobutylene, and hydrogen according to the equation shown above. Heretofore, the process has involved first preparing active aluminum by grinding certain aluminum powders (whose operability is ascertained by experimentation) together with a large amount of preformed crude triisobutyl aluminum in a vibrating ball mill made of steel and specially designed for working under an inert atmosphere, e.g. an atmosphere of nitrogen. It is thought that this operation effects removal of an oxide coating from the aluminum particles thereby exposing a chemically active metallic surface, and further reduces the size of the aluminum particles. The resulting suspension of aluminum powder in triisobutyl aluminum is transferred to a pressure autoclave. The desired amount of dry isobutylene is then charged, and hydrogen gas is fed into the autoclave until the pressure corresponds to the desired amount of hydrogen. The reaction mixture is agitated and heated. When the temperature reaches about 100° C., an exothermic reaction usually sets in, whereupon the temperature rises rapidly. Although it is usually intended to operate at about 120° C., the temperature may go as high as about 150° C. before control (by cooling means) can restrain the temperature. During the major portion of the reaction period the temperature is maintained at about 120° C. until the reaction is substantially complete. The reactor is then cooled, the residual gases are vented and the reaction product is removed. A portion of the product is withheld for use in grinding a further quantity of aluminum powder and the remainder is distilled under vacuum to recover therefrom a fraction of purified triisobutyl aluminum.

The process described above is troublesome and disadvantageous in several respects. Only certain kinds of high-purity aluminum powder can be used and these can be ascertained only by trial. The grinding step is slow, costly, and hazardous, and requires special equipment and additional handling. Furthermore, the yield of good quality triisobutyl aluminum obtained by such process is usually not more than about 40 percent of theory.

The general object of this invention is to provide alkyl aluminum compounds.

Another general object is to provide an improved method for the preparation of trialkyl aluminum compounds by the reductive alkylation of aluminum with alpha-olefins.

A more specific object is to provide such a method for the preparation of triisobutyl aluminum.

A still more specific object is to provide such a method for the preparation of triisobutyl aluminum by direct reaction of aluminum, isobutylene, and hydrogen, and which does not require a separate step of grinding the aluminum to effect activation thereof.

Another object is to provide such a method wherein ordinary commercial grades of aluminum powder can be employed as starting materials.

Another object is to provide such a method whereby high yields of trialkyl aluminum compounds, such as triisobutyl aluminum, can readily be obtained.

Another object is to provide such a method whereby triisobutyl aluminum can readily be obtained in a form of high purity.

Another object is to provide such a method as a step in the process for making organo-aluminum products.

Still other objects and advantages of the invention will be evident in the following description.

The objects of this invention have been attained in a method, more completely described hereinafter, wherein ordinary commercial aluminum powder is heated together with an alpha olefin, such as isobutylene, and hydrogen, in the presence of an organo-aluminum compound, such as the by-products from a previous run, at temperatures between about 140° and about 200° C. By these means and under these conditions, high yields of trialkyl aluminum compounds, such as triisobutyl aluminum, are readily obtained from ordinary commercial aluminum powder and without need of a special, separate step of grinding to effect its activation. Furthermore, the reaction time is materially shortened.

The aluminum powder that is available commercially for pigment purposes is satisfactory for the present purpose and usually has an assay value of 99.5 or more percent by weight aluminum. The aluminum may contain small amounts, preferably not more than about 0.5 percent by weight, of impurities incidental to its manufacture, but the proportion of metals, other than aluminum, that are capable of forming volatile alkyl metal compounds should be as low as possible. Some kinds of commercial aluminum powder have been subjected to chemical treatment, e.g. with surface active agents, with the object of rendering the metal powder more compatible with paint vehicles or plastic molding compositions; such treated aluminum powder is less satisfactory for the present process, and untreated powder is preferred. Since the rate of the reaction is somewhat proportional to the surface area of active metal, the aluminum powder is preferably employed in very finely divided form. Commercial aluminum powders having particles whose diameters are in the range below about 50 microns, e.g. from about 5 to about 50 microns, are readily available and are preferred, although aluminum that contains larger particles can be used.

By the term "alpha olefin" is meant an olefin having the group $CH_2=C<$ in its molecular structure, particularly an alpha-olefin of the class of 1,1-dialkylethylenes having the generic formula

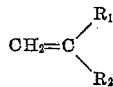

wherein the symbols $R_1$ and $R_2$ signify alkyl groups. As examples of suitable alpha-olefins, there may be mentioned isobutylene, 2-methyl-1-butene, 2,3-dimethyl-1-butene, 2-ethyl-1-butene, 2-ethyl-3-methyl-1-butene, 2- methyl-1-pentene, 2,3-dimethyl-1-pentene, 2,4-dimethyl-1-pentene, 2-ethyl-1-pentene, 2-methyl-1-hexene, 2,3-dimethyl-1-hexene, 2,4-dimethyl-1-hexene, 2,5-dimethyl-1-hexene, 2-ethyl-1-hexene, 2,3,3-trimethyl-1-butene, 2-ethyl-3,3-dimethyl-1-butene, and 2-isopropyl-3-methyl-1-butene.

In the description that follows, the invention is particularly described with reference to the reaction of isobutylene, aluminum, and hydrogen, and the preparation of triisobutyl aluminum. However, it should be understood that another alpha-olefin can be employed in place of isobutylene, and the corresponding trialkyl aluminum compound can be thereby prepared.

The alpha-olefin, e.g. the isobutylene, and hydrogen employed in the process must be dry, i.e. anhydrous, and substantially free of other materials that are reactive with organo-metal compounds, such as acetylenic compounds, oxygen, acidic compounds, ammonia, and organic compounds that contain active hydrogen atoms. Inert impurities such as butanes and nitrogen can be tolerated in the feed materials and are usually withdrawn from the system after the olefin has been substantially consumed.

The alpha-olefin is preferably charged in an amount corresponding to from about 3 to about 5-gram molecular weights per gram-atomic weight of aluminum, although larger or smaller proportions can be employed. The hydrogen is preferably charged in an amount corresponding to from about 0.5 to about 1-gram-molecular weight per gram-molecular weight of alpha olefin.

In addition to the reactants just described, e.g., the aluminum, isobutylene, and hydrogen, it is necessary that the reaction mixture contain an organo-metal compound such as a reaction initiator in an amount effective for promoting the reductive alkylation of the aluminum. Conveniently and preferably, this material is a product obtained from a previous run, e.g., in the preparation of triisobutyl aluminum, it can be the by-product material obtained as a high-boiling residue in the distillation of triisobutyl aluminum from the crude reaction product of a previous run. Such high-boiling residue usually comprises diisobutyl aluminum hydride and other materials that are not only desirable assistants in promoting reaction between a fresh charge of reactants but also enter into the desired reaction and are thereby converted to a further amount of the triisobutyl aluminum. Alternatively, a portion of the crude reaction product from a previous run, or a portion of the purified product itself, can be employed. Instead of material obtained from a previous run, there can be employed as reaction initiator other trialkyl aluminum compounds.

Inert liquid diluents, such as the saturated paraffinic hydrocarbons, cycloparaffinic hydrocarbons, and aromatic hydrocarbons having only nuclear unsaturation, can be employed as reaction media if desired, but are usually unnecessary.

In carrying out a batchwise embodiment of the invention, a suitable reactor, e.g., an autoclave designed for operation under pressure and provided with means for heating, cooling and agitating the contents, is charged with selected quantities of aluminum powder, organo-aluminum material, and alpha-olefin, e.g. isobutylene. The selected amount of hydrogen is usually charged by pressurizing the reactor with hydrogen to a pressure that corresponds to the selected amount of hydrogen, the desired pressure being computed from the dimensions of the reactor and by means of the well-known gas laws. The alpha-olefin and/or the hydrogen can be added portionwise or continuously to the reactor during the course of reaction, if desired.

The reactor is closed and the contents are agitated and heated. Using the starting materials described herein, the reaction does not usually begin until the temperature exceeds 120° C. The reaction usually becomes spontaneous when the temperature of the reaction mixture reaches about 140° C., although temperatures of 170° C. or more may sometimes be required, whereupon the reaction becomes exothermic. The temperature should not be allowed to rise above 250° C. Cooling is usually required to restrain the temperature. During at least the greater part of the reaction period, the temperature is maintained between about 140° and about 200° C., preferably between about 160° and about 180° C.

Triisobutyl aluminum is known to dissociate at atmospheric pressure at temperatures above about 120° C. according to the equation:

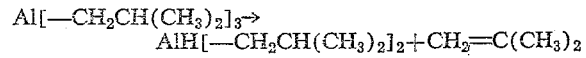

$$Al[-CH_2CH(CH_3)_2]_3 \rightarrow$$
$$AlH[-CH_2CH(CH_3)_2]_2 + CH_2=C(CH_3)_2$$

In view of this, it had hitherto been thought necessary to carry out the reductive alkylation reaction at temperatures not exceeding about 120° C. It has now been discovered that, under the conditions of the present process, the reductive alkylation reaction can advantageously be carried out at temperatures that are much in excess of 120° C., i.e. from about 140° to about 200° C. At such higher temperatures, the rate of reaction is accelerated and a more complete reaction takes place, i.e. a larger proportion of the starting material is converted to the desired trialkyl aluminum product. Moreover, at such temperatures, the reaction occurs with ordinary aluminum powder and does not require a separate step of activating a special kind of aluminum.

During the initial pre-reaction heating period, the pressure in the reactor increases. During the reaction the pressure in the reactor tends to decrease due to the consumption of the gaseous reactants. The course of the reaction can be followed by observing the reactor pressure. The reaction can be considered complete when the pressure in the reactor becomes constant at a constant temperature. The time required is usually from about one to about eight hours. The reaction product mixture is then cooled, preferably to below 120 C., usually to room temperature.

The reaction mixture can then be removed from the reactor, e.g. to a still. Usually some unreacted aluminum remains and it is preferable to withdraw substantially only liquid material while leaving the metallic aluminum as much as possible in the reactor for reaction in a subsequent run. A small amount of suspended solid material is usually not objectionable in the product, but the liquid can be filtered, e.g. through a chemically inert filter medium, to remove insoluble matter if desired. For some purposes, the resulting material can be employed without further purification. If desired, reaction mixtures that contain distillable trialkyl aluminum compounds can be subjected to distillation and the volatile material, e.g. triisobutyl aluminum, can be separated as distillate from a residue of higher-boiling by-products. Prior to distillation, or as a step thereof, it is desirable to boil off residual small amounts of low-boiling materials such as isobutylene, butane, and the like, e.g. by warming the liquid under vacuum. The actual distillation of triisobutyl aluminum from the crude reaction mixture is carried out under vacuum at distillation temperatures not in excess of about 70° C., preferably below about 65° C. In order to attain such distillation temperatures, distillation pressures of about one millimeter or less of mercury, absolute pressure, must be employed. An especially satisfactory still for this purpose is one of the kind known as a falling-film still. Such a still is advantageous over pot-and-column stills in providing a short distillation path, in permitting very low pressures throughout the still, in having a small inventory of material being subjected to heating at any one time, in allowing the use of a relatively small temperature differential between the heating medium and the material being heated, in having a high distillation rate, in allowing the feed material to contain small amounts of suspended solid matter, in effecting a substantially complete separation of the lower-boiling distillate from the higher-boiling residue, and in other ways.

The triisobutyl aluminum distillate so obtained usually has a high purity, e.g. an assay of 95 or more weight percent, and is obtained in amount corresponding to from about 85 percent of theoretical to the theoretical based on aluminum charged.

The higher-boiling residue from the distillation of triisobutyl aluminum comprises diisobutyl aluminum hydride and small amounts of finely divided metallic aluminum, and is desirably returned to the reactor together with a further charge of aluminum, isobutylene, and hydrogen. By this means, under the reaction conditions, at least some of the components of the residue are converted to a further amount of triisobutyl aluminum.

It has been observed in a series of batch runs of the kind just described that the yield of triisobutyl aluminum obtained per batch increases during the first few runs of a new series until the yield becomes substantially theoretical. During this period of operation, a quantity of unreacted aluminum accumulates in the reactor. This aluminum becomes highly activated by the prevailing conditions and contributes to the rapid reaction of the succeeding batches and to the superior yield and superior quality of the triisobutyl aluminum produced thereby. Furthermore, the temperature required to initiate reaction is often lower in later runs than in the first few runs of such a series. For example, in the making of triisobutyl aluminum, the first few runs of a series may require temperatures of the order of 170° C. to initiate an exothermic reaction whereas in later runs reaction can usually be initiated at temperatures in the order of from 140° to 150° C.

While the operations have been described above as being carried out in a batchwise manner, it is evident that the method of the invention can be carried out in semicontinuous or continuous manner.

It should be pointed out that trialkyl aluminum and similar organo-metal compounds are extremely reactive and often spontaneously ignite or explode on contact with air, water, oxidizing agents and compounds that contain active hydrogen atoms. All of the operations involving these materials must be undertaken with due regard for their hazardous properties and with exercise of health and safety precautions. Suitable devices and techniques for the safe handling of materials of this kind are already known.

The following examples illustrate the invention, but are not to be construed as limiting its scope.

*Example 1*

Into an autoclave having a total volume of 4.6 liters were charged 192 grams of aluminum powder, 295 grams of diisobutyl aluminum hydride (previously obtained by another method), and 1361 grams of isobutylene. The aluminum powder was an untreated commercial pigment powder having a fineness such that 99.9 percent passes a 200-mesh U. S. Standard screen, 97 percent passes a 325-mesh screen, and the particles have an average diameter of about 9 microns. Hydrogen gas was passed into the autoclave to a total gauge pressure of 3200 p.s.i., corresponding to about 0.65 mole of hydrogen per mole of isobutylene charged. The reaction mixture was agitated and heated. At a temperature of about 140° C. an exothermic reaction set in and cooling was applied. The pressure rose to a maximum of about 4300 p.s.i. gauge and then began to decrease. The rising temperature was checked at a maximum of 163° C. and thereafter was maintained at about 160° C. for two hours, during which the reaction was substantially completed. The temperature was then reduced to 120° C. and was maintained at about 120° C. for two hours. The final pressure was about 800 p.s.i. gauge. The autoclave was cooled and the residual gases were vented. The liquid reaction mixture was withdrawn and a 1380-gram portion thereof was distilled in a conventional still having a distillation pot and a short column at a distillation pressure of about 1 mm. of mercury, absolute pressure. There were obtained 515 grams of residue and 695 grams of triisobutyl aluminum distillate. The weight of triisobutyl aluminum distillate represents a yield of about 50 percent of theory based on the aluminum charged. A considerable amount of decomposition occurred during the distillation causing the formation of high-boiling by-products.

*Example 2*

Into an autoclave having a total capacity of 12.8 liters were charged 626 grams of a high boiling residue mixture that had been obtained in the distillation of triisobutyl aluminum in a manner similar to that described in Example 1, 300 grams of aluminium powder, and 3519 grams of isobutylene. The aluminum powder was an untreated commercial pigment powder having a fineness such that 100 percent passes a 100-mesh U.S. Standard screen, 80 percent passes a 325-mesh screen, and the particles have an average diameter of about 20 microns. Hydrogen gas was passed into the autoclave to a total gauge pressure of 3000 p.s.i., corresponding to about 0.79 mole of hydrogen per mole of isobutylene charged. The reaction mixture was agitated and heated. At a temperature of about 140° C. an exothermic reaction set in and cooling was applied. The pressure rose to a maximum of about 4600 p.s.i. gauge and then began to decrease. The rising temperature was checked at a maximum of 171° C. and thereafter was maintained at about 150° C. After two hours, during which the reaction was substantially completed, the temperature was reduced to about 120° C. and was maintained at about 120° C. for two more hours. The final pressure was about 300 p.s.i. gauge. The autoclave was cooled and the residual gases were vented. The liquid reaction mixture was withdrawn and amounted to 3253 grams. A 1600-gram portion of the crude reaction mixture was set aside and a 1653-gram portion was distilled in a falling-film still at a distillation pressure of about 1 mm. of mercury, absolute pressure, and a hot-wall temperature of about 70° C. There were thereby obtained 1020 grams of triisobutyl aluminum distillate having an assay value of 97 percent by weight and a residue fraction weighing 388 grams. The yield of triisobutyl aluminum distillate was about 91 percent of theory based on the aluminum charged.

*Example 3*

Into the autoclave, described in Example 2, that had been previously used for reacting aluminum, isobutylene, and hydrogen, and from which the major part of the resulting liquid reaction mixture had been withdrawn leaving a quantity of unreacted aluminum, was charged 1037 grams of the crude reaction mixture that was obtained in Example 2, 300 grams of aluminum powder like that described in Example 2, and 3700 grams of isobutylene. Hydrogen gas was passed into the autoclave to a total pressure of 2800 p.s.i. gauge, corresponding to about 0.61 mole of hydrogen per mole of isobutylene charged. The reaction mixture was agitated and heated. An exothermic reaction set in at a temperature of about 140° C., and cooling was applied. The pressure rose to a maximum of about 4800 p.s.i. gauge and then began to decrease. The rising temperature was checked at a maximum of 170° C. and thereafter was maintained at about 160° C. for about two hours, during which the reaction was substantially completed. The temperature was then reduced to about 120° C. for another two hours. The final steady pressure was about 600 p.s.i. gauge. The autoclave was cooled and the residual gases were vented. The liquid reaction mixture was withdrawn and a 2692-gram portion was distilled in a falling-film still at a distillation pressure of about 1 mm. of mercury, absolute pressure, and a hot wall temperature of about 70° C. There were thereby obtained a high-boiling residue and a distillate fraction of about 2235 grams, the latter including about 640 grams that is considered to be derivable from the 1037 grams of crude reaction mixture from Example 2 that was present in the charge of starting materials.

*Example 4*

Into an autoclave, described in Example 2, were charged 400 grams of aluminum powder like that described in Example 2, 1172 grams of a high-boiling residue obtained in the distillation of triisobutyl aluminum in a manner similar to that described in Example 2, and 3653 grams of isobutylene. The autoclave had previously been used in a series of runs for reacting aluminum, isobutylene, and hydrogen. In each of these runs, the major part of the resulting liquid reaction mixture had been withdrawn, leaving a quantity of unreacted aluminum behind in the autoclave. To this unmeasured quantity of residual aluminum, wet with the liquid reaction product of the previous run, the above-described fresh charge was added. Hydrogen gas was passed into the autoclave to a total pressure of 3000 p.s.i. gauge, corresponding to about 0.65 mole of hydrogen per mole of isobutylene charged. The reaction mixture was agitated and heated. An exothermic reaction set in at a temperature of about 140° C. and cooling was applied. The pressure rose to a maximum of about 4000 p.s.i. gauge and then began to decrease. The rising temperature was checked at about 180° C. and thereafter was maintained at about 160° C. for 1.5 hours. The autoclave was cooled and the residual gases were vented. The liquid reaction mixture was withdrawn and was distilled in a manner described in Examples 2 and 3. There was thereby obtained 2773 grams of triisobutyl aluminum distillate. The weight of triisobutyl aluminum distillate corresponds to a yield of about 95 percent of theory based on the aluminum charged.

We claim:

1. A method for making a trialkylaluminum compound whose alkyl groups have from 4 to 8 carbon atoms, which method consists of forming a mixture consisting essentially of commercial grade finely divided aluminum, an alpha-olefin having from 4 to 8 carbon atoms, hydrogen, and at least one halogen-free alkylaluminum compound selected from the group consisting of trialkyl-aluminums and di-alkylaluminum hydrides wherein the alkyl groups have from 4 to 8 carbon atoms, heating the mixture at a temperature of at least 140° C. to initiate an exothermic reaction, preventing the temperature from rising above 250° C., controlling the temperature during the greater part of the reaction period to between 140° C. and 200° C. while maintaining the reaction mixture at a pressure of at least 300 p.s.i.g., cooling the reaction mixture to a temperature below 120° C., and separating therefrom a trialkyl aluminum compound whose alkyl groups have from 4 to 8 carbon atoms.

2. A method according to claim 1 wherein the alpha-olefin is isobutylene and the trialkylaluminum compound is triisobutylaluminum.

3. A method according to claim 2 wherein the aluminum is in the form of particles most of which have diameters below 50 microns and there are employed not more than 5 moles of isobutylene per atom of aluminum and from 0.5 to 1 mole of hydrogen per mole of isobutylene.

4. In a method for making triisobutyl aluminum which consists of repeated cycles of operation, the steps in one such cycle which consist of forming a mixture consisting essentially of commercial grade aluminum, isobutylene, hydrogen, and a distillation residue obtained in a previous cycle in a manner hereinafter specified and consisting essentially of halogen-free alkylaluminum compounds selected from the group consisting of trialkylaluminums and di-alkylaluminum hydrides wherein the alkyl groups are isobutyl groups, the aluminum being in the form of particles most of which have diameters below 50 microns, there being not more than 5 moles of isobutylene per atom of aluminum and from 0.5 to 1 mole of hydrogen per mole of isobutylene, heating the mixture at a temperture of at least 140° C. to initiate an exothermic reaction, preventing the temperature from rising above 250° C., controlling the temperature during the greater part of the reaction period to between 140° and 200° C. while maintaining the reaction mixture at a pressure of at least 300 p.s.i.g., cooling the reaction mixture to a temperature below 120° C., withdrawing a liquid reaction product, and distilling that liquid reaction product to obtain a distillate comprising triisobutylaluminum and a distillation residue, such residue being useable in a subsequent cycle to form a starting mixture as hereinbefore specified.

5. A process for making triisobutyl aluminum comprising forming a mixture consisting of commercial aluminum powder, isobutylene, hydrogen and triisobutyl aluminum in an amount effective to promote alkylation of the aluminum, heating the mixture at a temperature of at least about 150° C. and below the ultimate decomposition temperature of the triisobutyl aluminum while maintaining the mixture under super-atmospheric pressure, whereby the aluminum becomes active and reacts with the isobutylene and hydrogen, and separating therefrom the triisobutyl aluminum formed.

References Cited in the file of this patent

UNITED STATES PATENTS 2,271,956    Ruthruff _____ Feb. 3, 1942

FOREIGN PATENTS 535,235    Belgium _____ Feb. 15, 1955

OTHER REFERENCES

Hnizda et al.: Journ. Am. Chem. Soc. 60, page 2276 (1938).

Zeigler et al.: Angew. Chem. 67, 424 (1955).